(12) United States Patent
Oda et al.

(10) Patent No.: US 10,007,834 B2
(45) Date of Patent: Jun. 26, 2018

(54) DETECTION CONTROL DEVICE, DETECTION SYSTEM, NON-TRANSITORY STORAGE MEDIUM, AND DETECTION CONTROL METHOD

(71) Applicant: FUJIFILM CORPORATION, Tokyo (JP)

(72) Inventors: Hideto Oda, Yokohama (JP); Ryota Ozaki, Yokohama (JP); Noriji Kato, Yokohama (JP)

(73) Assignee: FUJIFILM CORPORATION, Tokyo (JP)

( * ) Notice: Subject to any disclaimer, the term of this patent is extended or adjusted under 35 U.S.C. 154(b) by 38 days.

(21) Appl. No.: 15/070,521

(22) Filed: Mar. 15, 2016

(65) Prior Publication Data

US 2016/0196464 A1    Jul. 7, 2016

Related U.S. Application Data

(63) Continuation of application No. PCT/JP2014/073632, filed on Sep. 8, 2014.

(30) Foreign Application Priority Data

Jan. 20, 2014 (JP) ................. 2014-007774

(51) Int. Cl.
   *G06K 9/00* (2006.01)
   *G06T 1/20* (2006.01)
   *G06T 7/00* (2017.01)

(52) U.S. Cl.
   CPC ....... *G06K 9/0014* (2013.01); *G06K 9/00127* (2013.01); *G06K 9/00134* (2013.01);
   (Continued)

(58) Field of Classification Search
   CPC .......... G06K 9/00127; G06K 9/00134; G06K 9/0014; G06K 9/00973;
   (Continued)

(56) References Cited

U.S. PATENT DOCUMENTS 5,850,475 A * 12/1998 Kasao .............. G06K 9/46
   382/173
7,796,835 B2 * 9/2010 Matsumoto ........... G06T 15/08
   345/419
(Continued)

FOREIGN PATENT DOCUMENTS

CN    101180802 A    5/2008
CN    102346856 A    2/2012
(Continued)

OTHER PUBLICATIONS

Kyo et al (Mapping schemes of image recognition tasks onto highly parallel SIMD/MIMD processors, IEEE 2009.*
(Continued)

*Primary Examiner* — Amara Abdi
(74) *Attorney, Agent, or Firm* — Oliff PLC (57) ABSTRACT

A detection control device includes a detection target image acquiring unit that acquires an imaged image resulting from imaging a specimen that is to be subjected to the detection of the target cell, a processing target region setting unit that sets a plurality of processing target regions in the imaged image, a processing target region distributing unit that distributes, in accordance with a distribution amount of data to each of a plurality of processing devices that detect the target cell in an image region, the plurality of processing target regions to the plurality of processing devices, and a detection result acquiring unit that acquires, from each of the plurality of processing devices, a result of a process of
(Continued)

detecting the target cell in the processing target regions distributed to the respective plurality of processing devices.

8 Claims, 10 Drawing Sheets

(52) U.S. Cl.
CPC ............ G06K 9/00973 (2013.01); G06T 1/20 (2013.01); G06T 7/0012 (2013.01); *G06T 2207/20021* (2013.01); *G06T 2207/30024* (2013.01)

(58) Field of Classification Search
CPC . G06T 2207/20021; G06T 2207/30024; G06T 7/0012; G06T 1/20
USPC .......................... 382/133, 128, 134; 600/407
See application file for complete search history.

(56) References Cited

U.S. PATENT DOCUMENTS

| | | | |
|---|---|---|---|
| 9,715,413 B2* | 7/2017 | Abdalla | G06F 9/505 |
| 2004/0093166 A1* | 5/2004 | Kil | G01N 1/06 |
| | | | 702/19 |
| 2009/0191585 A1* | 7/2009 | Yamada | G01N 15/1475 |
| | | | 435/34 |
| 2009/0254713 A1* | 10/2009 | Jeong | G06F 13/1605 |
| | | | 711/151 |
| 2010/0229178 A1* | 9/2010 | Ito | G06F 9/5083 |
| | | | 718/104 |
| 2012/0020567 A1* | 1/2012 | Natori | G06K 9/00778 |
| | | | 382/195 |
| 2014/0092228 A1* | 4/2014 | Usuba | G06K 9/0014 |
| | | | 348/79 |
| 2015/0086103 A1* | 3/2015 | Tsunomori | G06T 7/0012 |
| | | | 382/133 |

FOREIGN PATENT DOCUMENTS

| | | |
|---|---|---|
| JP | H08-030787 A | 2/1996 |
| JP | H11-327120 A | 11/1999 |
| JP | 2008-065815 A | 3/2008 |
| JP | 4346923 B2 | 10/2009 |
| WO | 2012/169088 A1 | 12/2012 |

OTHER PUBLICATIONS

Kyo, Shorin et al., "Mapping Schemes of Image Recognition Tasks onto Highly Parallel SIMD/MIMD Processors," Third ACM/IEEE International Conference on Distributed Smart Cameras, 2009, pp. 1-6.

Kim, Joo-Young et al., "An attention controlled milto-core architecture for energy efficient object recognition," Signal Processing: Image Communication, vol. 25, (2010), pp. 363-376.

Preston, Kendall Jr., "Architectures for Image Processing in Biomedical Microscopy," IEEE Computer Society Workshop on Computer Architecture for Pattern Analysis and Image Database Management, (1981), pp. 318-322.

Oct. 7, 2014 Search Report issued in International Patent Application No. PCT/JP2014/073632.

Oct. 7, 2014 Written Opinion issued in International Patent Application No. PCT/JP2014/073632.

Jan. 10, 2017 Office Action issued in Japanese Patent Application No. 2014-007774.

Kyo, Shorin et al. "Mapping Schemes of Image Recognition Tasks onto Highly Parallel SIMD/MIMD Processors." 2009.

Jan. 25, 2018 Office Action issued in Chinese Patent Application No. 201480055250.3.

\* cited by examiner

| PROCESSING DEVICE ID | ARITHMETIC CAPACITY VALUE OF PROCESSOR CORES | NUMBER OF PROCESSOR CORES | PERFORMANCE VALUE |
|---|---|---|---|
| 50-1 | 1 | 1 | 1 |
| 50-2 | 1.5 | 2 | 3 |
| ⋮ | ⋮ | ⋮ | ⋮ |
| 50-N | 2 | 3 | 6 |

| PROCESSING TARGET REGION ID | COORDINATE POSITION INFORMATION | | | PROCESSING DEVICE ID | PROCESS COMPLETION FLAG | IMAGE DATA |
| --- | --- | --- | --- | --- | --- | --- |
| | REFERENCE POINT | WIDTH | HEIGHT | | | |
| A0001 | (x1, y1) | W1 | H1 | 50-1 | F | 1001··· |
| A0002 | (x2, y2) | W2 | H2 | 50-1 | F | 0101··· |
| A0003 | (x3, y3) | W3 | H3 | 50-2 | T | 0100··· |
| A0004 | (x4, y4) | W4 | H4 | 50-3 | T | 0011··· |

FIG. 7

| IDENTIFICATION TARGET REGION ID | COORDINATE POSITION INFORMATION | | | SCORE | TARGET CELL FLAG | PROCESSING TARGET REGION ID |
|---|---|---|---|---|---|---|
| | REFERENCE POINT | WIDTH | HEIGHT | | | |
| B0001 | (x10, y10) | W0 | H0 | 10 | T | A0001 |
| B0002 | (x11, y10) | W0 | H0 | −10 | F | A0001 |
| B0003 | (x12, y10) | W0 | H0 | 20 | T | A0001 |
| ... | ... | ... | ... | ... | ... | ... |
| B1001 | (x21, y21) | W0 | H0 | 2 | F | A0002 |

DETECTION CONTROL DEVICE, DETECTION SYSTEM, NON-TRANSITORY STORAGE MEDIUM, AND DETECTION CONTROL METHOD

CROSS REFERENCE TO RELATED APPLICATION

This is a continuation of International Application No. PCT/JP2014/073632 filed on Sep. 8, 2014, and claims priority from Japanese Patent Application No. 2014-007774, filed on Jan. 20, 2014.

BACKGROUND

Technical Field

The present invention relates to a detection control device, a detection system, a non-transitory storage medium, and a detection control method.

SUMMARY

At least one embodiment of the present invention provides a detection control device including imaged image acquiring unit that acquires an imaged image resulting from imaging a specimen that is to be subjected to detection of a target cell, setting unit that sets a plurality of processing target regions in the imaged image, distributing unit that distributes, in accordance with a distribution amount of data to each of a plurality of processing units that detect the target cell in an image region, the plurality of processing target regions to the plurality of processing units, and processing result acquiring unit that acquires, from each of the plurality of processing units, a result of a process of detecting the target cell in the processing target regions distributed to the respective plurality of processing units.

BRIEF DESCRIPTION OF THE DRAWINGS

Exemplary embodiment(s) of the present invention will be described in detail based on the following figures, wherein.

DETAILED DESCRIPTION

An exemplary embodiment for implementing the present invention (hereinafter referred to as the embodiment) will be described below based on the drawings.

[1. Description of System Configuration]

Figure 1:
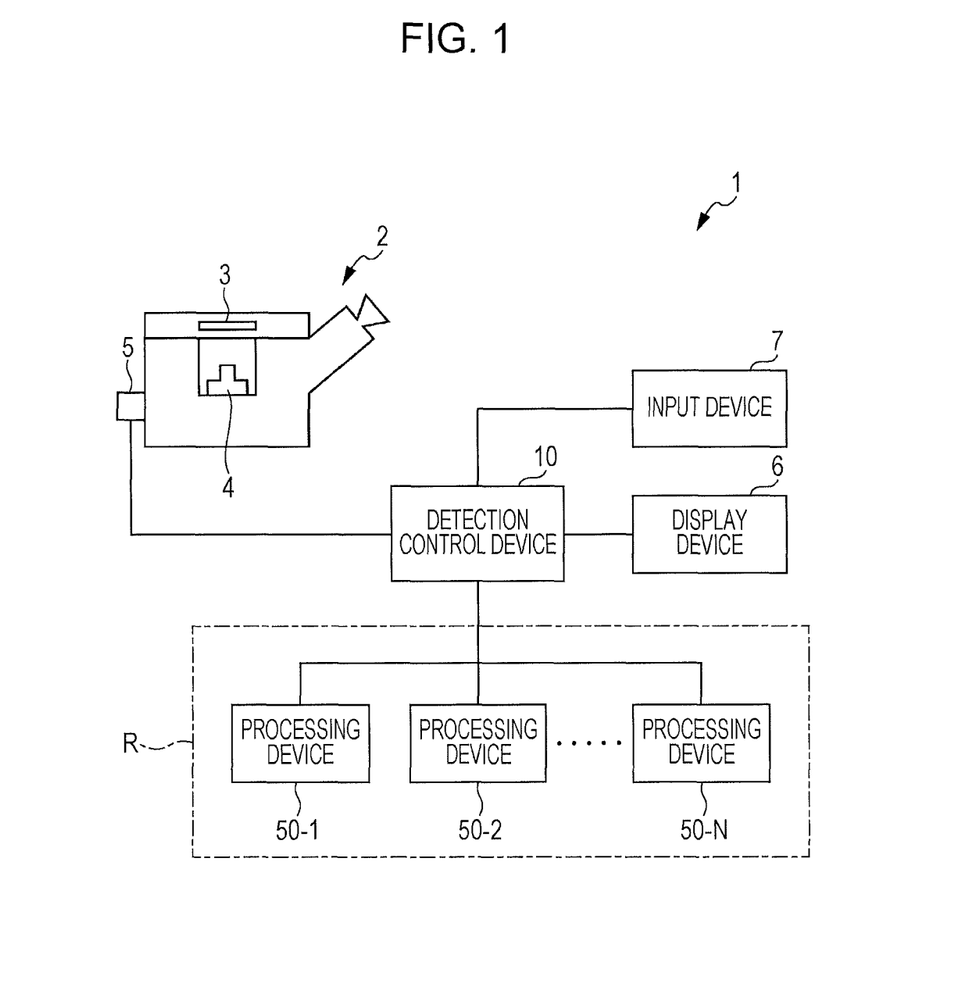
FIG. 1 is a system configuration diagram of a detection system according to the present embodiment.

FIG. 1 illustrates a system configuration diagram of a target cell detection system 1 according to the present embodiment. As illustrated in FIG. 1, the target cell detection system 1 includes an optical microscope 2, a detection control device 10, an input device 7, a display device 6, and an arithmetic resource R. The arithmetic resource R includes a plurality of processing devices 50-1 to 50-N (N represents an integer equal to or greater than 2), and each processing device 50-$i$ (i represents an integer of 1 to N) is communicably connected to the detection control device 10. The detection control device 10 is also data-communicably connected to the optical microscope 2, the input device 7, and the display device 6. Although an example having the arithmetic resource R provided outside the detection control device 10 will be described in the present embodiment, the arithmetic resource R may be provided inside the detection control device 10.

In the optical microscope 2, a sample on a glass slide 3 disposed on a sample stage is imaged by a CCD camera 5 via an optical system such as an objective lens 4. The optical microscope 2 may include a focusing mechanism for changing the distance between the glass slide 3 and the objective lens 4, and image the sample on the glass slide 3 sealed from above with a prepared slide at different focal distances. In the present embodiment, maternal blood applied to the glass slide 3 and subjected to May-Giemsa staining is used as the sample. Thereby, fetus-derived nucleated red blood cells (NRBCs) in the maternal blood are stained blue-violet. Hereinafter, the NRBCs will each be referred to as the target cell.

The detection control device 10 acquires the imaged image resulting from the imaging by the optical microscope 2, extracts nucleus candidate regions for the nucleus of the target cell from the acquired imaged image, and sets processing target regions corresponding to image regions to be subjected to the detection of the target cell based on the extracted nucleus candidate regions. The detection control device 10 then distributes the set processing target regions to the processing devices 50-1 to 50-N, causes each of the processing devices 50-1 to 50-N to execute a process of detecting the target cell, acquires the results of detection of the target cell from the processing devices 50-1 to 50-N, integrates the acquired detection results, and outputs an integrated detection result to the display device. Details of the process of detecting the target cell executed by the detection control device 10 and the processing devices 50-1 to 50-N will be described later.

Each processing device 50-$i$ (i represents an integer of 1 to N), which includes one or more processor cores, sets one or more identification target regions (unit image regions on which an identifying device performs a process of identifying the target cell) in the processing target regions allocated by the detection control device 10, and executes a process of determining the possibility of the target cell being included in the set identification target regions (the process of detecting the target cell). The processing device 50-$i$ (i represents an integer of 1 to N) then transmits the results of detection of the target cell executed on the allocated processing target regions to the detection control device 10.

The input device 7, which is a device such as a keyboard or a mouse, for example, inputs an operation received from a user to the detection control device 10. For example, the detection control device 10 may acquire, as learning information for learning positive examples and negative examples of image features of the target cell, the information of an image region specified in an image displayed on the display device 6 by the user with the input device 7, and cause the identifying device to learn identification conditions (identification parameters) of the target cell based on the learning information. The detection control device 10 may further provide the learned identification conditions (identification parameters) to the respective processing devices 50-$i$ (i represents an integer of 1 to N).

The display device 6, which is a liquid crystal display device, for example, displays a screen based on the result of processing by the detection control device 10. For example, the display device 6 displays the imaged image resulting from the imaging by the optical microscope 2, the result of detection of the target cell by the detection control device 10, and so forth.

[2. Description of Functions]

Figure 2:
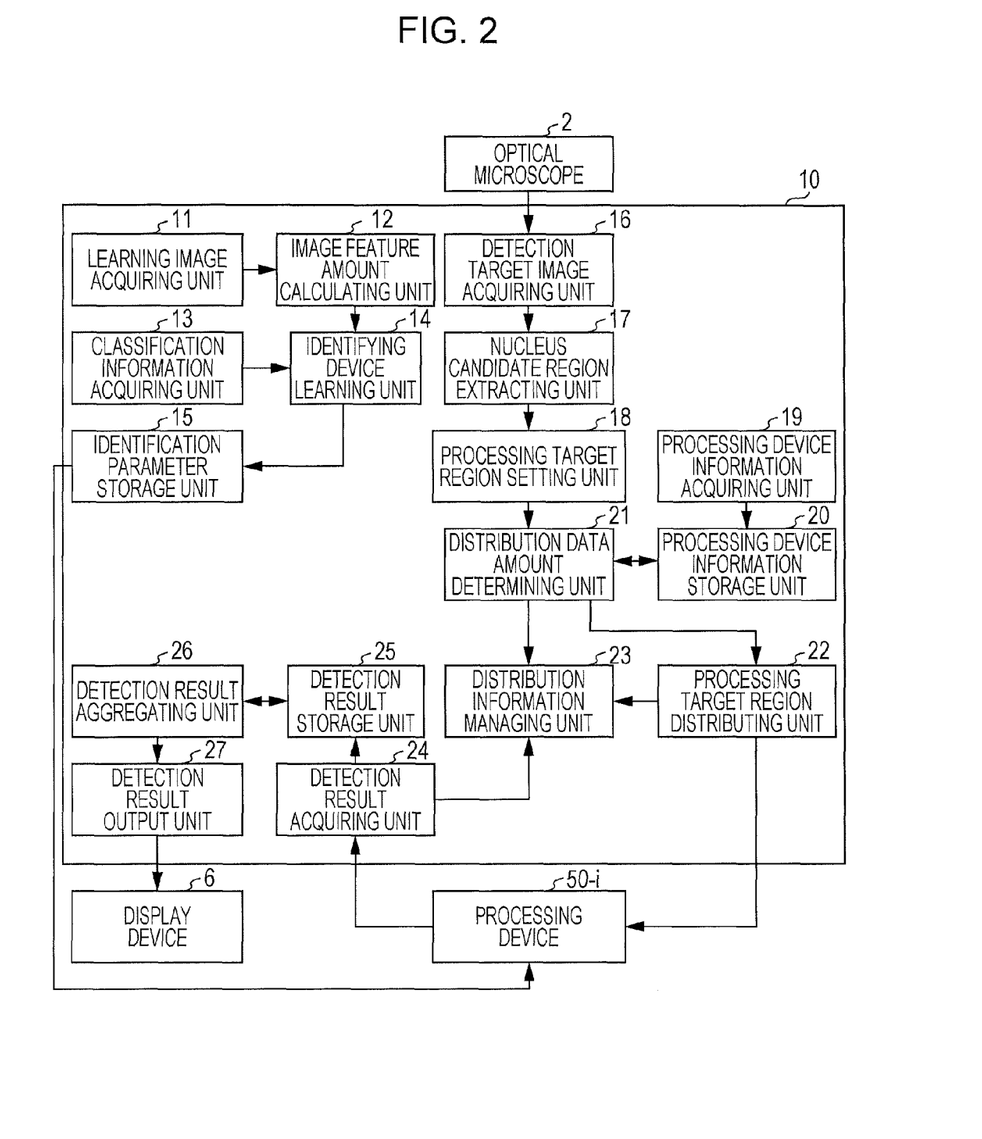
FIG. 2 is a functional block diagram of a detection control device according to the present embodiment.
Figure 3:
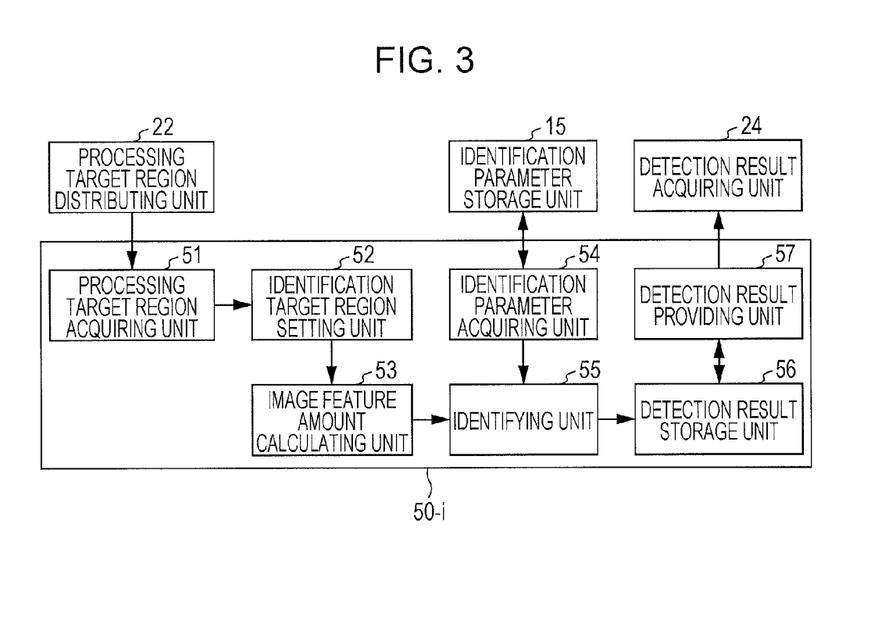
FIG. 3 is a functional block diagram of a processing device according to the present embodiment.

With reference to FIGS. 2 and 3, description will now be given of an example of the functions provided to the detection control device 10 and the processing devices according to the present embodiment.

[2.1. Description of Functions Provided to Detection Control Device 10]

An example of the functions provided to the detection control device 10 will first be described based on the functional block diagram of the detection control device 10 illustrated in FIG. 2.

As illustrated in FIG. 2, the detection control device 10 includes a learning image acquiring unit 11, an image feature amount calculating unit 12, a classification information acquiring unit 13, an identifying device learning unit 14, an identification parameter storage unit 15, a detection target image acquiring unit 16, a nucleus candidate region extracting unit 17, a processing target region setting unit 18, a processing device information acquiring unit 19, a processing device information storage unit 20, a distribution data amount determining unit 21, a processing target region distributing unit 22, a distribution information managing unit 23, a detection result acquiring unit 24, a detection result storage unit 25, a detection result aggregating unit 26, and a detection result output unit 27.

The functions of the above-described units included in the detection control device 10 may be realized as a computer, which includes a control unit such as a CPU, a storage unit such as a memory, an input-output unit that transmits and receives data to and from an external device, and so forth, reads and executes a program stored in a computer-readable information storage medium. The program may be supplied to the detection control device 10 serving as a computer by an information storage medium such as an optical disk, a magnetic disk, a magnetic tape, a magneto-optical disk, or a flash memory, or may be supplied to the detection control device 10 via a data communication network such as the Internet. Details of the functions of the units included in the detection control device 10 will be described below.

The learning image acquiring unit 11 acquires a sample image (learning image) for causing the identifying device to learn the identification conditions of the target cell. For example, the learning image acquiring unit 11 may acquire the learning image based on a file path of the image received by the input device and region specification information of the image. The learning image acquiring unit 11 may acquire the learning image from a storage unit inside the detection control device 10 or from a database outside the detection control device 10.

The image feature amount calculating unit 12 calculates an image feature amount of the learning image acquired by the learning image acquiring unit 11. For example, the image feature amount calculating unit 12 generates, for each of pixels (or pixel groups each including a plurality of pixels) in all or a part of the learning image, the image feature amount based on image information of a given region having the pixel (or pixel group) as the center (or the coordinates of the pixel or one of the pixels included in the pixel group as a reference point). For example, one or more of the RGB value, the SIFT feature, the HOG feature, and the Gabor feature of the pixels may be used as the image feature amount.

As a specific example, if the HOG feature is used as the image feature amount, for instance, the image feature amount calculating unit 12 calculates the brightness gradient direction and the brightness gradient strength for each of the pixels in the target image region, divides the target image region into Y blocks each formed of X cells, calculates brightness gradient direction histograms ([the value in the first gradient direction, the value in the second gradient direction, . . . , the value in the ninth gradient direction]) for each of the cells configuring the individual block from the brightness gradient direction and the brightness gradient strength, and performs normalization in blocks such that the root mean square of these equals 1. Then, the image feature calculating unit may determine X×9 values produced by combining the above-normalized brightness gradient direction histograms in the block as the feature amount of the block, and determine Y×X×9 values produced by combining all blocks in the target image region as the HOG feature amount of the target image region.

The classification information acquiring unit 13 receives classification information of the learning image acquired by the learning image acquiring unit 11 from, for example, the input device or the external device (a user terminal or the like) connected to the detection control device 10. For example, the classification information acquiring unit 13 may receive classification information that determines a positive example (true: T) if the learning image acquired by the learning image acquiring unit 11 shows the target cell and determines a negative example (false: F) if the learning image acquired by the learning image acquiring unit 11 does not show the target cell.

Based on the image feature amount and the classification information of the learning image acquired by the learning image acquiring unit 11, the identifying device learning unit 14 learns identification parameters of the identifying device that identifies the presence or absence of the target cell in the image region. For example, Adaboost, support vector machine (SVM), nearest neighbor identifying device, random forest identifying device, or other Gaussian mixture distribution models may be used as the identifying device.

The identification parameter storage unit 15 stores the identification parameters of the identifying device for identifying the target cell learned by the identifying device learning unit 14.

The detection target image acquiring unit 16 acquires the image to be subjected to the detection of the target cell (a detection target image). For example, the detection target image acquiring unit 16 acquires from the optical microscope the imaged image resulting from imaging the sample with the CCD camera 5 provided to the optical microscope as the detection target image.

The nucleus candidate region extracting unit 17 extracts the nucleus candidate regions from the detection target image acquired by the detection target image acquiring unit 16 based on pixels having a color (RGB value) or density within a predetermined range. For example, the nucleus candidate region extracting unit 17 may binarize the pixels in the detection target image with a predetermined color (or density) threshold. Specifically, the nucleus candidate region extracting unit 17 may extract pixels having a color (or density) darker than the threshold (or equaling or exceeding the threshold) as black pixels. The nucleus candidate region extracting unit 17 may calculate plural sets of connected pixels (pixel groups) extracted from the individual image acquired by the detection target image acquiring unit 16, and determine rectangular regions circumscribed to the respective sets as the nucleus candidate regions.

Based on the nucleus candidate regions extracted by the nucleus candidate region extracting unit 17, the processing target region setting unit 18 sets, in the detection target image acquired by the detection target image acquiring unit 16, the processing target regions (target cell candidate regions) determined as image regions that may include the target cell. For example, based on an expression of the relationship between the size range of the nucleus of the target and the size range of the cell, the processing target region setting unit 18 may set image regions (rectangular regions, for example) on a surface of the glass slide, in which the target cell may be located, as the processing target regions, or may set image regions enlarged from the nucleus candidate regions at a predetermined aspect ratio with a point (centroid, for example) in each of the nucleus candidate regions as the center as the processing target regions (target cell candidate regions).

The processing device information acquiring unit 19 acquires the information of the processing devices included in the arithmetic resource R available to the detection control device 10. For example, based on data input with the input device or data acquired from the individual processing device 50-$i$ ($i$ represents an integer of 1 to N) included in the arithmetic resource R, the processing device information acquiring unit 19 acquires the information of the individual processing device 50-$i$. The information of the processing device may include the arithmetic capacity value of the processor cores and the number of the processor cores. For example, when the arithmetic capacity value of the processor cores in the processing device 50-$i$ and the number of the processor cores are represented as $S_i$ and $C_i$, respectively, a performance value $P_i$ of the processing device 50-$i$ may be determined as $P_i=S_i \cdot C_i$.

Figure 4:
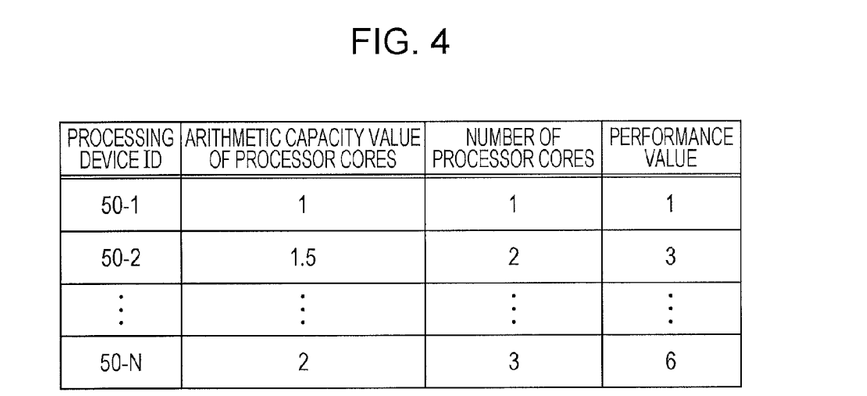
FIG. 4 is a diagram illustrating an example of a processing device information management table.

The processing device information storage unit 20 stores the information of the processing devices acquired by the processing device information acquiring unit 19. Herein, FIG. 4 illustrates an example of a processing device information management table stored in the processing device information storage unit 20. As illustrated in FIG. 4, the information of a processing device ID for identifying each processing device, the arithmetic capacity value of the processor cores included in the processing device, the number of the processor cores, and the performance value may be stored in association with one another in the processing device information management table.

Based on the information of the processing devices stored in the processing device information storage unit 20 and the plurality of processing target regions set for the detection target image by the processing target region setting unit 18, the distribution data amount determining unit 21 determines a data amount representing the size of a load to be distributed to the individual processing device 50-$i$ ($i$ represents an integer of 1 to N). For example, the distribution data amount determining unit 21 determines a load index value $L_i$ to be distributed to the individual processing device 50-$i$ based on a load index value L of each of the plurality of processing target regions set for the detection target image and the performance value $P_i$ of the individual processing device 50-$i$.

For example, the load index value L of the processing target region may be determined as the number of the identification target regions set in the processing target region based on the size of the processing target region, the size of the identification target regions set in the processing target region and serving as the unit image regions for determining the possibility of the presence of the target cell, and a movement amount in the setting of the identification target regions in the processing target region. As a specific example, if the processing target region is an image region having 30×30 pixels, the identification target region is an image region having 20×20 pixels, and the movement amount of the identification target region in the vertical or horizontal direction is 2 pixels, the number of movements in the vertical direction×the number of movements in the horizontal direction=((30−20)/2)×((30−20)/2)=25 may be calculated as the load index value of the processing target region (that is, the number of the set identification target regions).

Figure 5:
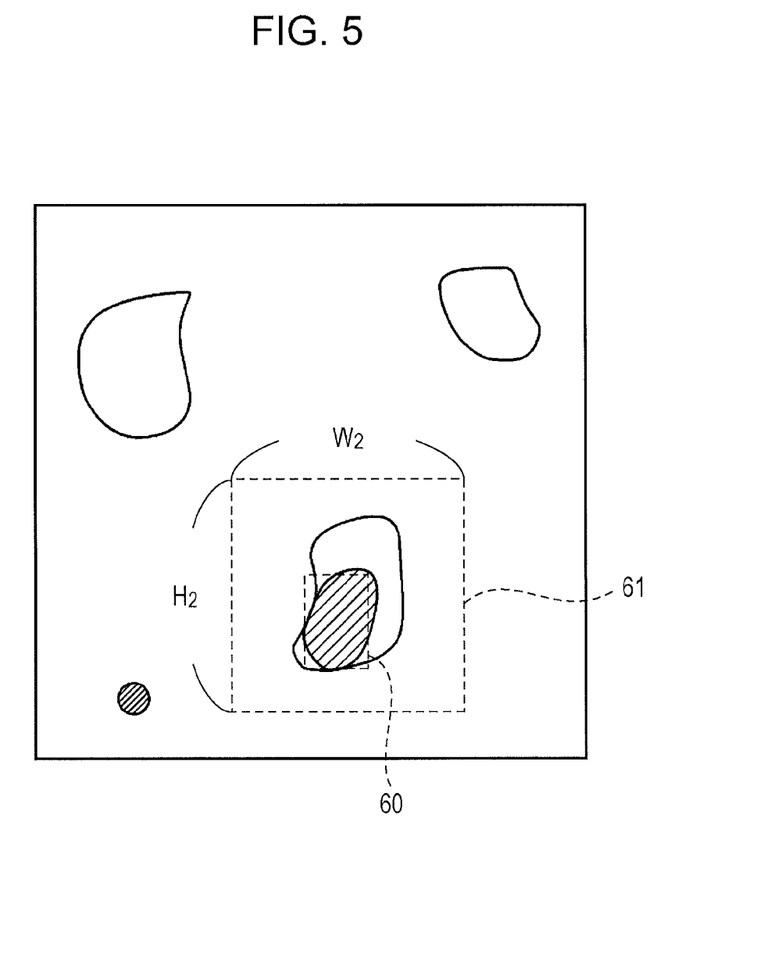
FIG. 5 is a diagram illustrating an example of a nucleus candidate region and a processing target region.

Further, the load index value L of the processing target region is not limited to the above-described one, and may be determined as follows. FIG. 5 illustrates an example of a nucleus candidate region 60 and a processing target region 61. Herein, as illustrated in FIG. 5, when the nucleus candidate region 60 has a width W1 and a height H1 and the processing target region 61 has a width W2 and a height H2, the load index value L of the processing target region 61 is calculated on, for example, the following bases (1) to (8):

(1) The area of the processing target region 61=W2·H2

(2) The sum of two adjacent sides of the processing target region 61=W2+H2

(3) The data size (in RGB) of the processing target region 61=W2·H2·3

(4) The area of the nucleus candidate region 60=W1·H1

(5) The sum of two adjacent sides of the nucleus candidate region 60=W1+H1

(6) The data size (in RGB) of the nucleus candidate region 60=W1·H1·3

(7) The number of black pixels in the nucleus candidate region 60

(8) The length of the outer circumference of the black pixels in the nucleus candidate region 60

Further, when SL represents the sum total of the load index values of all processing target regions set for the detection target image and SP represents the sum total of respective performance values P1 to PN of the processing devices 50-1 to 50-N, the distribution data amount determining unit 21 may calculate the load index value (distribution data amount) to be distributed to the processing device 50-$i$ ($i$ represents an integer of 1 to N) as $D_i=SL \cdot P_i/SP$.

Based on the distribution data amount determined for the individual processing device 50-$i$ ($i$ represents an integer of 1 to N) by the distribution data amount determining unit 21, the processing target region distributing unit 22 distributes the plurality of processing target regions set for the detection target image by the processing target region setting unit 18 to the individual processing device 50-$i$. For example, based on the load index value (distribution data amount) Di determined for the individual processing device 50-$i$, the processing target region distributing unit 22 may select from undistributed processing target regions a group of processing target regions with the sum of the impossible index values falling within a predetermined range from Di, and distribute the selected group of processing target regions to the processing device 50-$i$. Further, the processing target region distributing unit 22 may execute the process of distributing the processing target regions such that each of all processing target regions set for the detection target image is distributed to one of the processing devices 50-$i$.

Figure 6:
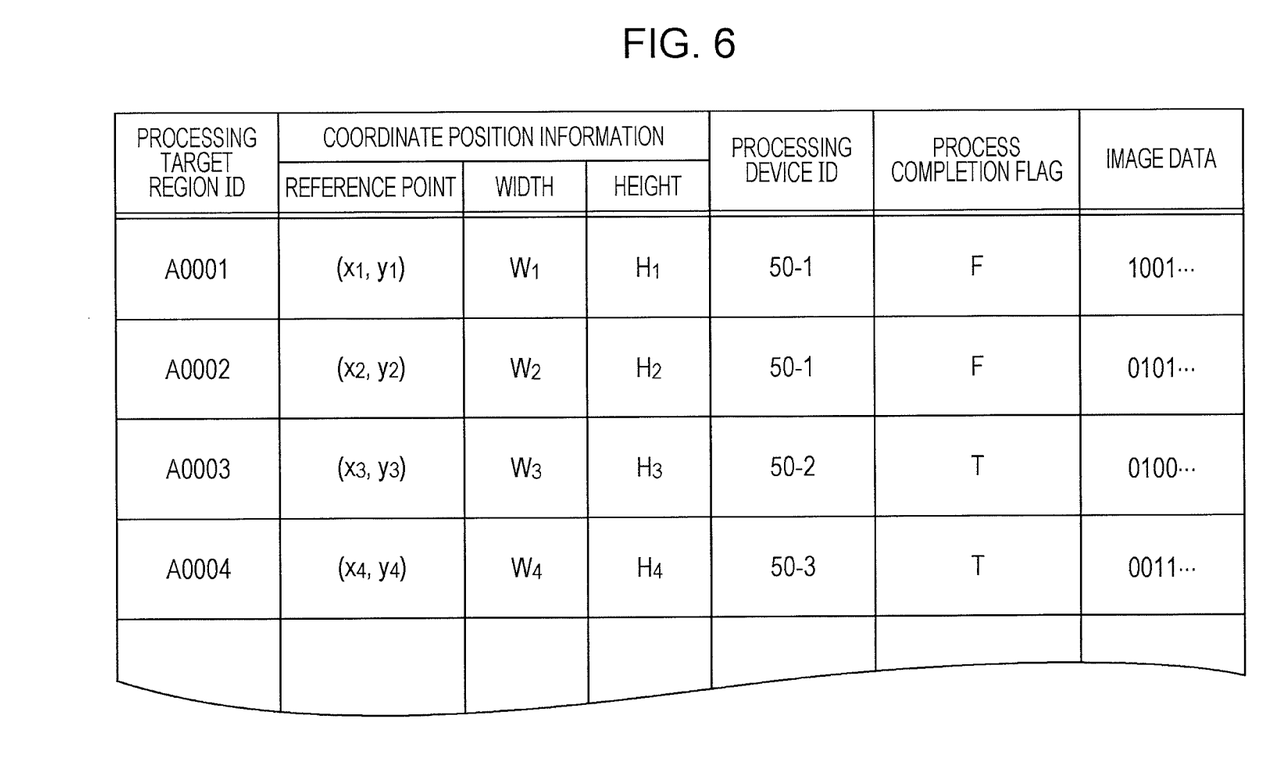
FIG. 6 is a diagram illustrating an example of a distribution information management table.

The distribution information managing unit 23 manages the information of the result of distribution of the processing target regions by the processing target region distributing unit 22. FIG. 6 illustrates an example of a distribution information management table managed by the distribution information managing unit 23. As illustrated in FIG. 6, a processing target region ID for identifying each processing target region, a coordinate position on the prepared slide (a coordinate position in a prepared slide coordinate system) of the processing target region, a processing device ID for identifying the processing device to which the processing target region is distributed, a process completion flag indicating whether or not the detection process by the processing device has been completed (set to true (T) when the process is completed, and set to false (F) when the process is uncompleted), and image data (or a path of an image) of the processing target region are stored in association with one another in the distribution information management table.

The detection result acquiring unit 24 acquires from each of the processing devices 50-$i$ (i represents an integer of 1 to N) the results of detection of the target cell in the processing target regions distributed to each of the processing devices 50-$i$ by the processing target region distributing unit 22. For example, the detection result acquiring unit 24 may acquire, for each of the identification target regions set for the processing target regions, the information of the coordinate position on the prepared slide of the identification target region and a score (reliability or probability, for example) representing the possibility that the target cell is included in the identification target region. The distribution information managing unit 23 updates the value of the process completion flag in the distribution information management table to process completed (T) for any processing target region, the result of which has been acquired by the detection result acquiring unit 24.

The detection result storage unit 25 stores the information of the detection results acquired by the detection result acquiring unit 24. For example, the detection result storage unit 25 stores, for each of the identification target regions set for the processing target regions, the information of the coordinate position on the prepared slide of the identification target region and the score representing the possibility that the target cell is included in the identification target region.

If the process completion flags of all processing target regions have been updated to process completed (T) in the distribution information management table managed by the distribution information managing unit 23, the detection result aggregating unit 26 generates an integrated detection result of the detection target image based on the detection results of the respective identification target regions stored in the detection result storage unit 25. For example, the detection result aggregating unit 26 may generate a list of identification target regions stored in the detection result storage unit 25 (or identification target regions having a score equaling or exceeding a threshold) and sorted in descending order of the score representing the possibility of corresponding to the target cell.

The detection result output unit 27 outputs the integrated detection result generated by the detection result aggregating unit 26. For example, the detection result output unit 27 may cause the display device to display the list generated by the detection result aggregating unit 26.

[2.2. Description of Functions Provided to Processing Device]

Based on the functional block diagram of the processing device 50-$i$ (i represents an integer of 1 to N) illustrated in FIG. 3, an example of the functions provided to the processing device 50-$i$ will now be described.

As illustrated in FIG. 3, the processing device 50-$i$ includes a processing target region acquiring unit 51, an identification target region setting unit 52, an image feature amount calculating unit 53, an identification parameter acquiring unit 54, an identifying unit 55, a detection result storage unit 56, and a detection result providing unit 57.

The functions of the above-described units included in the processing device 50-$i$ may be realized as a computer, which includes a control unit such as a CPU, a storage unit such as a memory, an input-output unit that transmits and receives data to and from an external device, and so forth, reads and executes a program stored in a computer-readable information storage medium. The program may be supplied to the processing device 50-$i$ serving as a computer by an information storage medium such as an optical disk, a magnetic disk, a magnetic tape, a magneto-optical disk, or a flash memory, or may be supplied to the processing device 50-$i$ via a data communication network such as the Internet. Details of the functions of the units included in the processing device 50-$i$ will be described below.

The processing target region acquiring unit 51 acquires one or more processing target regions distributed to the processing device by the processing target region distributing unit 22 of the detection control device 10. The information of each of the processing target regions includes the coordinate position of a reference point of the processing target region (an upper-left point of the processing target region, for example) in the prepared slide coordinate system, the width (W) and the height (H) of the processing target region, and the image data.

The identification target region setting unit 52 sets, for each of the processing target regions acquired by the processing target region acquiring unit 51, one or more identification target regions serving as processing units for determining the possibility of the presence of the target cell. For example, the identification target region setting unit 52 may clip a rectangular region having a predetermined size (a width A and a height B, for example) from the processing target region with the upper-left apex set as a clipping reference point selected from the processing target region, and set the clipped rectangular region as one identification target region. Then, the identification target region setting unit 52 may sequentially move the clipping reference point by a predetermined movement amount (the C pixels in the vertical or horizontal direction, for example) and sequentially set the identification target regions based on the moved clipping reference point.

The image feature amount calculating unit 53 calculates the image feature amount for each of the identification target regions set by the identification target region setting unit 52. For example, the image feature amount calculating unit 53 generates the image feature amount for each of pixels (or pixel groups each including a plurality of pixels) in all or a part of the identification target region based on image information of a given region having the pixel (or pixel group) as the center (or the coordinates of the pixel or one of the pixels included in the pixel group as a reference point). For example, one or more of the RGB value, the SIFT feature, the HOG feature, and the Gabor feature may be used as the image feature amount.

The identification parameter acquiring unit 54 acquires the identification parameters learned about the identifying device for the target cell, which are stored in the identification parameter storage unit 15 of the detection control device 10.

Based on the identification parameters acquired by the identification parameter acquiring unit 54 and the image feature amount of the identification target region, the identifying unit 55 determines the possibility (reliability) that the target cell is included in the identification target region. For example, the identifying unit 55 may obtain an identification result by inputting the image feature amount of the identification target region to the identifying device set with the identification parameters. AdaBoost, SVM (support vector machine), or the like may be used as the identifying device. Based on the image feature amount of the identification target region, the identifying device outputs a score representing the possibility that the target cell is included in the identification target region. For example, the identifying device may output a positive score if the cell included in the identification target region is the target cell, and output a negative score if the cell included in the identification target region is not the target cell. Further, the identifying unit 55 may update the value of a target cell flag, which indicates the presence or absence of the target cell associated with the identification target region, to a value indicating the inclusion of the target cell (true: T) if the score of the identification target region output by the identifying device equals or exceeds a threshold.

Figure 7:
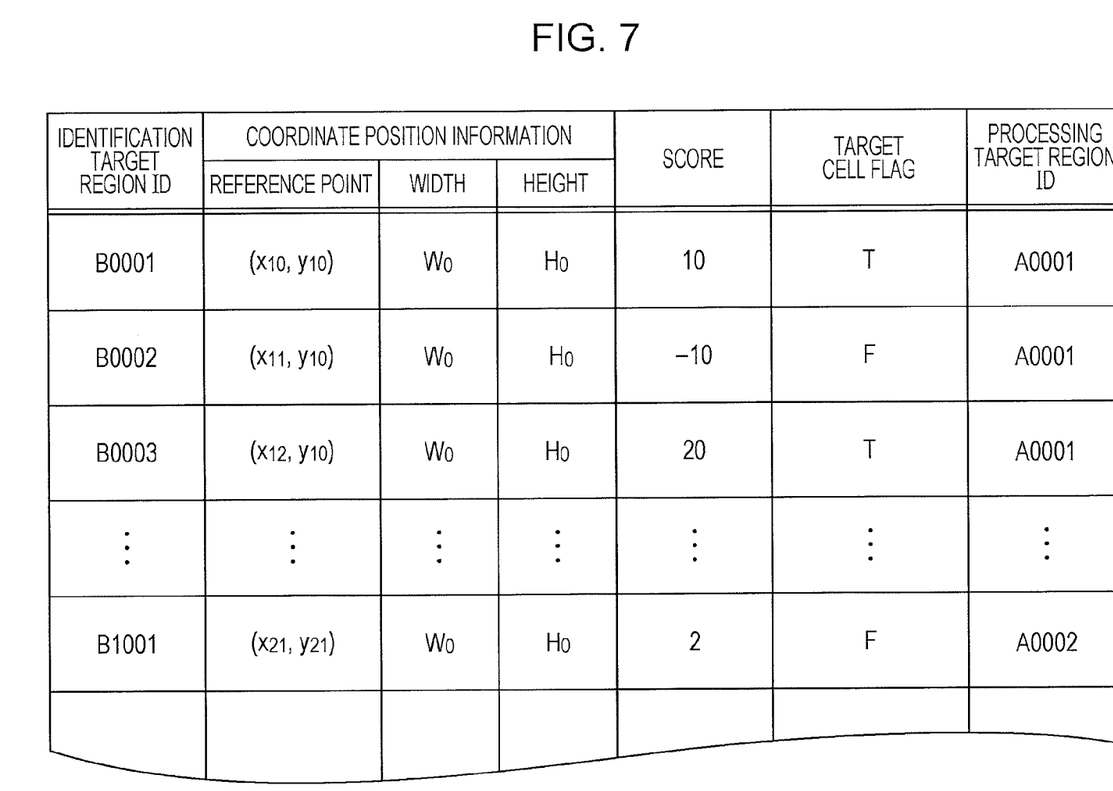
FIG. 7 is a diagram illustrating an example of a detection result management table.

The detection result storage unit 56 stores a detection result obtained by the identifying unit 55. FIG. 7 illustrates an example of a detection result management table stored in the detection result storage unit 56. As illustrated in FIG. 7, information items of an identification target region ID for identifying each identification target region, the coordinate positon of the identification target region in the prepared slide coordinate system, the score output by the identifying device, the target cell flag, and the identification information of the processing target region (the processing target region ID) to which the identification target region belongs are stored in association with one another in the detection result management table.

The detection result providing unit 57 provides the detection control device 10 with the information of the detection result management table stored in the detection result storage unit 56. For example, the detection result providing unit 57 may transmit the information of the detection result management table to the detection control device 10, if the identifying unit 55 has processed all identification target regions set by the identification target region setting unit 52.

[3. Description of Details of Process]

An example of the process executed in the target cell detection system 1 according to the present embodiment will now be described in detail based on FIGS. 8 to 11.

[3.1. Description of Overall Flow of Detection Process]

Figure 8:
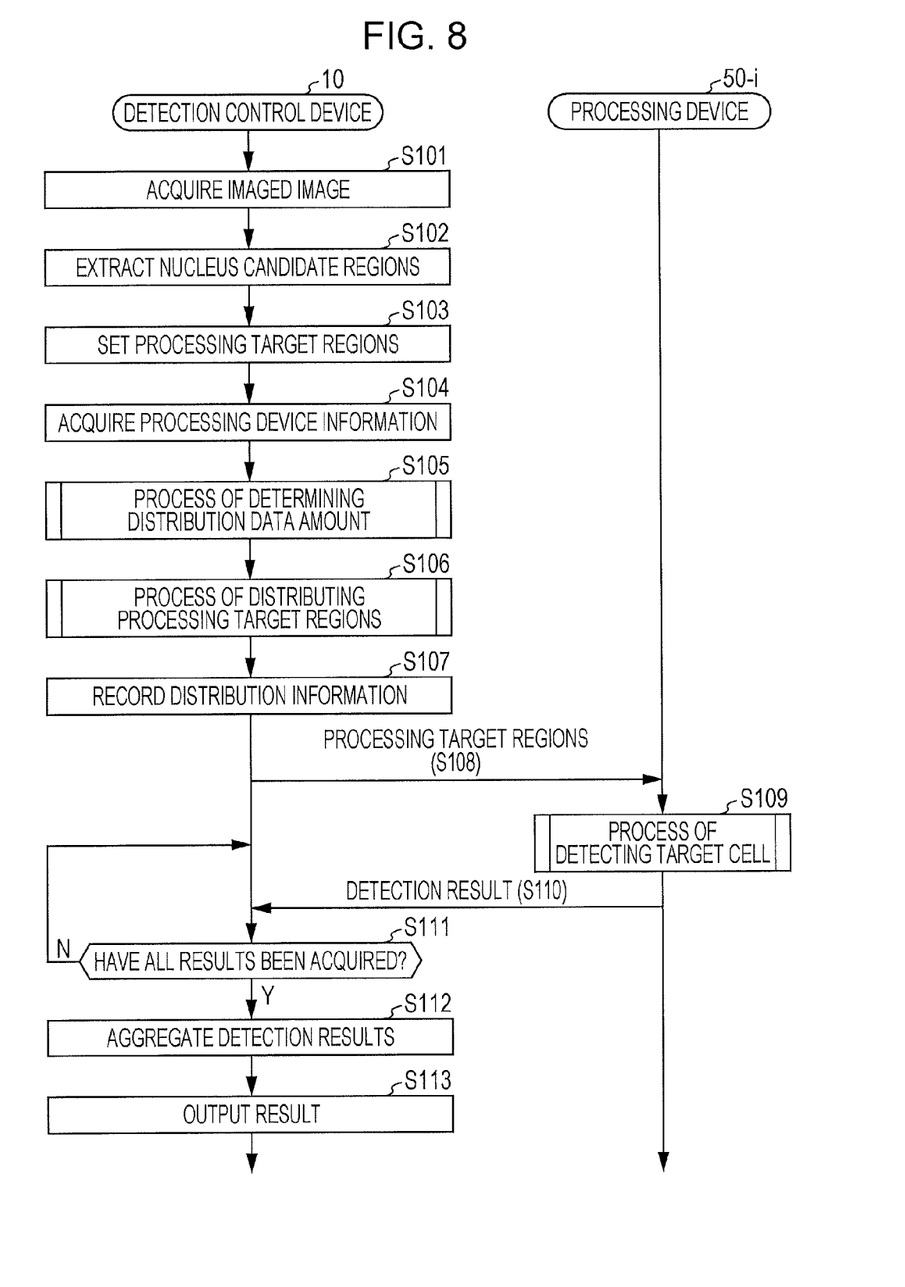
FIG. 8 is a sequence diagram illustrating an overall flow of a detection process.

FIG. 8 illustrates a sequence diagram illustrating an overall flow of the process of detecting the target cell executed in the target cell detection system 1. As illustrated in FIG. 8, the detection control device 10 acquires from the optical microscope the imaged image (detection target image) resulting from imaging a specimen (maternal blood) (S101). The detection control device 10 then causes the nucleus candidate region extracting unit 17 to extract the nucleus candidate regions from the imaged image acquired at S101 (S102), and causes the processing target region setting unit 18 to set the processing target regions for the respective nucleus candidate regions extracted at S102 (S103). In the present sequence example, the respective processing target regions will be denoted as $A_1$ to $A_M$ on the assumption that M (M represents an integer equal to or greater than 2) processing target regions have been set.

Then, the detection control device 10 causes the processing device information acquiring unit 19 to acquire the information (including processing capacity information, for example) of the plurality of processing devices 50-1 to 50-N that execute the process of detecting the target cell (S104). The detection control device 10 then determines the distribution data amount to be distributed to each of the plurality of processing devices 50-1 to 50-N based on the processing target regions set at S103 and the processing capacity information of the plurality of processing devices 50-1 to 50-N (S105). Herein, details of the process of determining the distribution data amount will be described with reference to the flowchart illustrated in FIG. 9.

[3.2. Description of Process of Determining Distribution Data Amount]

Figure 9:
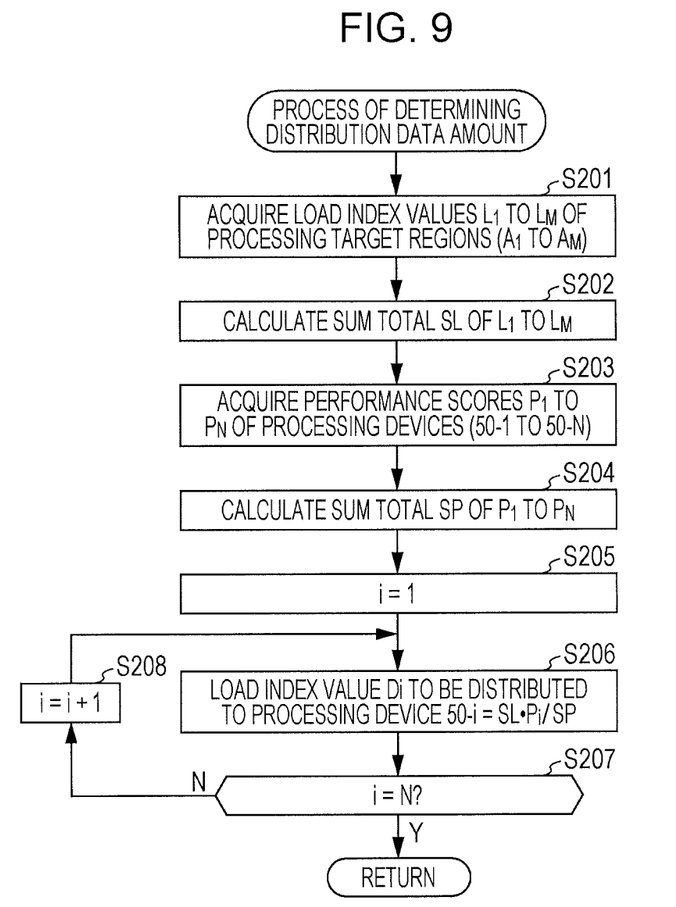
FIG. 9 is a flowchart of a process of determining a distribution data amount.

As illustrated in FIG. 9, the detection control device 10 acquires respective load index values $L_1$ to $L_M$ of the processing target regions $A_1$ to $A_M$ set at S103 (S201), and calculates the sum total SL of the acquired load index values $L_1$ to $L_M$ (S202). The load index value may be the number of identification target regions set for each processing target region, the area of the processing target region, the area of the nucleus candidate region in the processing target region, or the like.

The detection control device 10 then acquires the respective performance scores (performance values) $P_1$ to $P_N$ of the processing devices 50-1 to 50-N (S203), and calculates the sum total SP of the acquired performance values $P_1$ to $P_N$ (S204).

The detection control device 10 initializes the variable i to 1 (S205), and calculates the load index value (distribution data amount) $D_i$ to be distributed to the processing device 50-i as $D_i = SL \cdot P_i / SP$ (S206). If the variable i has not reached N (S207: N), the detection control device 10 increments i (adds 1 to i) and returns to S206. If the variable i has reached N (S207: Y), the detection control device 10 returns and proceeds to S106 in FIG. 8. The description will continue below, returning to the sequence diagram in FIG. 8.

As illustrated in FIG. 8, having determined the distribution data amount to be distributed to each of the plurality of processing devices 50-1 to 50-N, the detection control device 10 executes a distribution process of distributing each of the processing target regions $A_1$ to $A_M$ set at S103 to one of the processing devices 50-1 to 50-N based on the determined distribution data amount (S106). Herein, details of the process of determining the distribution data amount will be described with reference to the flowchart illustrated in FIG. 10.

[3.3. Description of Process of Distributing Processing Target Regions]

Figure 10:
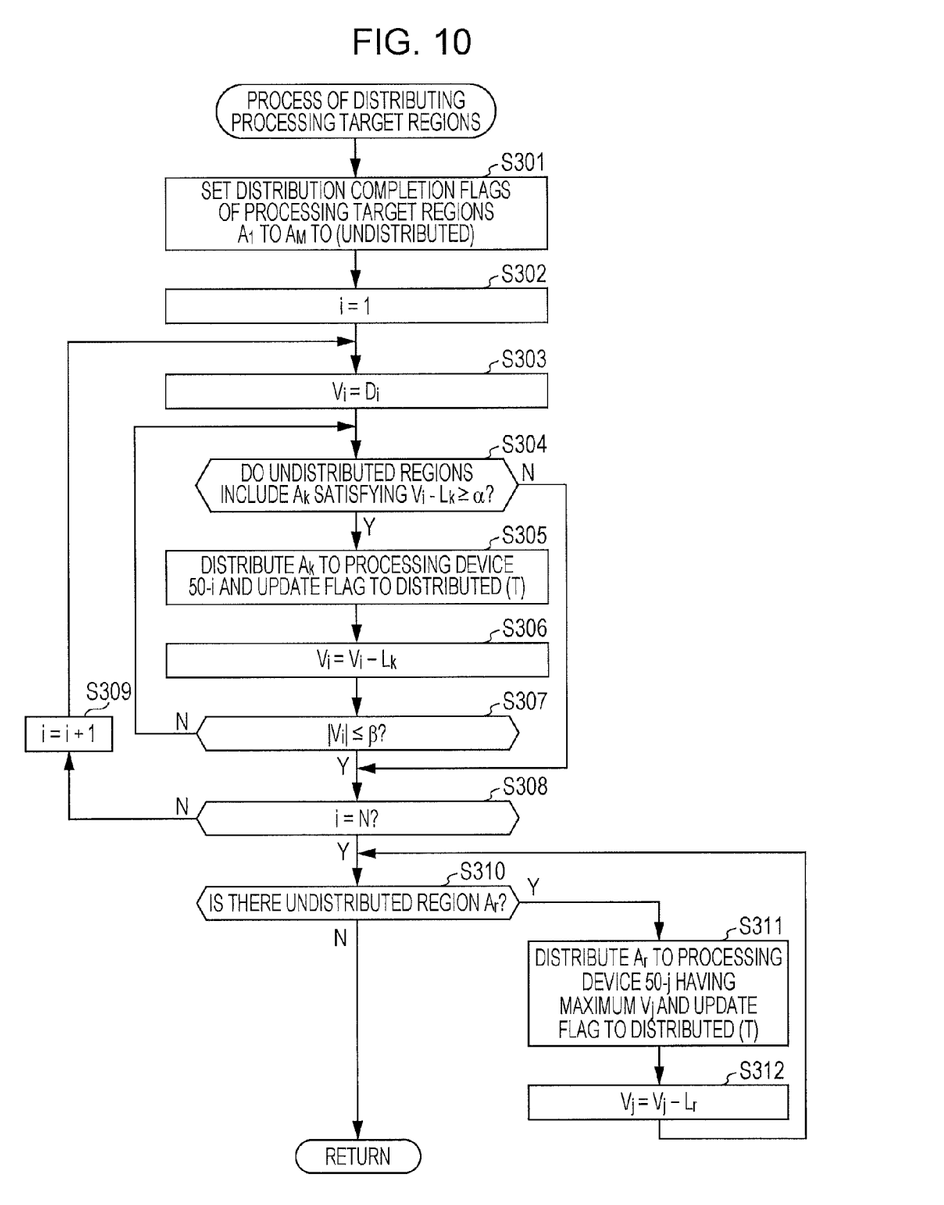
FIG. 10 is a flowchart of a process of distributing processing target regions.

As illustrated in FIG. 10, the detection control device 10 first sets a distribution completion flag (a truth value set to distributed (true: T) or undistributed (false: F)) of each of the processing target regions $A_1$ to $A_M$ to undistributed (false: F) (S301).

Then, the detection control device 10 initializes the variable i to 1 (S302), and sets the distribution data amount $D_i$ determined for the processing device 50-$i$ as the initial value of an acceptable distribution amount $V_i$ of the processing device 50-$i$ (S303).

The detection control device 10 determines whether or not the undistributed processing target regions include a processing target region $A_k$ satisfying $V_i - L_k \geq \alpha$ where k represents an integer of 1 to M, Lk represents the load index value of the processing target region $A_k$, and $\alpha$ (0, for example) represents a threshold (S304).

If the detection control device 10 determines at S304 that the processing target region $A_k$ satisfying $V_i - L_k \geq \alpha$ is present (S304: Y), the detection control device 10 distributes the processing target region $A_k$ to the processing device 50-$i$ and updates the distribution completion flag of the processing target region $A_k$ to distributed (true: T) (S305). The detection control device 10 further updates the acceptable distribution amount $V_i$ by subtracting the load index value $L_k$ from the acceptable distribution amount $V_i$ (S306).

Then, if the absolute value of the acceptable distribution amount $V_i$ is not equal to or smaller than a threshold $\beta$ (>0) (S307: N), the detection control device 10 returns to S304. If the absolute value of the acceptable distribution amount $V_i$ is equal to or smaller than the threshold $\beta$ (>0) (S307: N), the detection control device 10 proceeds to S308. If the detection control device 10 determines at S304 that the processing target region $A_k$ satisfying $V_i - L_k \geq \alpha$ is absent (S304: N), the detection control device 10 also proceeds to S308.

If the variable i has not reached N at S308 (S308: N), the detection control device 10 increments i (add 1 to i) (S309) and returns to S303.

Further, if the variable i has reached N at S308 (S308: Y), the detection control device 10 determines whether or not the processing target regions $A_1$ to $A_M$ include an undistributed processing target region $A_r$ where r represents an integer of 1 to M (S310).

If the undistributed processing target region $A_r$ is present at S310 (S310: Y), the detection control device 10 distributes the processing target region $A_r$ to a processing device 50-$j$ having an acceptable distribution amount $V_j$ at the maximum level (or closest to $L_r$) where j represents an integer of 1 to N, and updates the distribution completion flag of the processing target region $A_r$ to distributed (true: T) (S311). The detection control device 10 further updates the acceptable distribution amount $V_j$ by subtracting the load index value $L_r$ from the acceptable distribution amount $V_j$ (S312), and returns to S310.

If the undistributed processing target region $A_r$ is absent at S310 (S310: N), the detection control device 10 returns and proceeds to S107 in FIG. 8. The description will continue below, returning to the sequence diagram in FIG. 8.

As illustrated in FIG. 8, the detection control device 10 records distribution information including the information of the processing target regions distributed to the processing devices 50-1 to 50-N(S107), and transmits the distributed processing target regions to each of the processing devices 50-$i$ (i represents an integer of 1 to N) (S108).

The processing devices 50-$i$ execute the process of detecting the target cell on the processing target regions received from the detection control device 10 (S109). Herein, details of the process of detecting the target cell will be described with reference to the flowchart illustrated in FIG. 11. The process illustrated in FIG. 11 may be executed independently by each of the processing devices 50-$i$ (i represents an integer of 1 to N).

[3.4. Description of Process of Detecting Target Cell]

Figure 11:
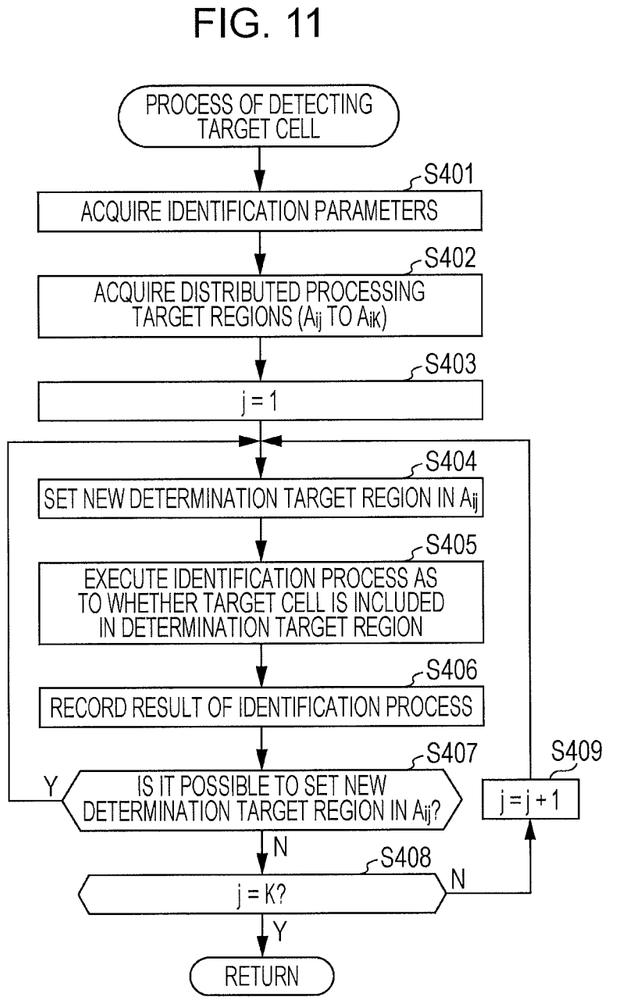
FIG. 11 is a flowchart of a process of detecting a target cell executed by the processing device.

As illustrated in FIG. 11, the processing device 50-$i$ (i represents an integer of 1 to N) causes the identification parameter acquiring unit 54 to acquire from the detection control device 10 the identification parameters of the identifying device that has learned the image features of the target cell (S401).

The processing device 50-$i$ acquires processing target regions ($A_{i1}$ to $A_{iK}$) distributed by the detection control device 10, wherein an integer K represents the number of processing target regions distributed to the processing device 50-$i$ (S402).

The processing device 50-$i$ initializes the variable j to 1 (S403), and sets a new identification target region in the processing target region $A_{ij}$ (S404). The processing device 50-$i$ then inputs the image feature amount of the identification target region to the identifying device set with the identification parameters acquired at S401, to thereby execute an identification process as to whether or not the target cell is included in the identification target region set at S404 (S405), and records the output (score) from the identifying device in the step in association with the processing target region $A_{ij}$ (S406).

If it is possible to set a new identification target region in the processing target region $A_{ij}$ (S407: Y), the processing device 50-$i$ returns to S404. If it is not possible to set a new identification target region in the processing target region $A_{ij}$ (S407: N), the processing device 50-$i$ proceeds to S408.

If the variable j has not reached K at S408 (S408: N), the processing device 50-$i$ increments j (add 1 to j) (S409), and returns to S404. If the variable j has reached K at S408 (S408: Y), the processing device 50-$i$ returns and proceeds to S110 in FIG. 8. The description will continue below, returning to the sequence diagram in FIG. 8.

As illustrated in FIG. 8, the processing device 50-$i$ transmits the score recorded for the identification target region to the detection control device 10 as the result of the detection process (S110).

If the detection control device 10 has not acquired the detection results from all of the processing devices 50-1 to 50-N(S111: N), the detection control device 10 stands by. If the detection control device 10 has acquired the detection results from all of the processing devices 50-1 to 50-N(S111: Y), the detection control device 10 generates the integrated detection result by aggregating the acquired detection results of all of the identification target regions (S112), outputs the generated integrated detection result (S113), and completes the process. The detection control device 10 may generate the integrated detection result by, for example, sorting the identification target regions acquired from the processing devices 50-1 to 50-N in descending order of the score output by the identifying device.

If an identification target region is selected from the identification target regions included in the integrated detection result, the detection control device 10 may control the optical microscope based on the coordinate position of the selected identification target region on the prepared slide to image an enlarged image of the selected identification target region at the coordinate position on the prepared slide. The detection control device 10 may further display the imaged enlarged image on the display device.

Further, the present invention is not limited to the above-described embodiment. Although an example in which the detection control device 10 executes mechanical learning of the identifying device for the target cell is used in the above-described embodiment, a device other than the detection control device 10 may execute the mechanical learning of the identifying device for the target cell. Further, the processing target regions may also be allocated to the detection control device 10 to cause the detection control device 10 to execute the detection of the target cell. Further, if the processing devices 50-1 to 50-N are provided inside the detection control device 10, the processing devices 50-1 to 50-N may be processors each including one or more processor cores, or may be processor cores.

What is claimed is:

1. A detection control device comprising:
a processor that is configured to implement as:
an imaged image acquiring unit that acquires an imaged image resulting from imaging a specimen that is to be subjected to detection of a target cell;
a setting unit that sets a plurality of processing target regions in the imaged image;
a distributing unit that distributes, in accordance with a distribution amount of data to each of a plurality of processing units that detect the target cell in an image region, the plurality of processing target regions to the plurality of processing units;
a processing result acquiring unit that acquires, from each of the plurality of processing units, a result of a process of detecting the target cell in the processing target regions distributed to the respective plurality of processing units, wherein
the distributing unit sets the distribution amount of data to each of the plurality of processing units to increase with an increase in a performance value of each of the plurality of processing units, by:
determining, for each of the plurality of processing target regions, a load index value corresponding to a size of a load of the process of detecting the target cell; and
determining load index values to be distributed to each of the plurality of processing units, based on a sum total of the load index values of the plurality of processing target regions and the performance value of each of the plurality of processing units, and
wherein the distributing unit distributes one or more processing target regions selected from the plurality of processing target regions, based on the sum of the load index values determined for each of the plurality of processing units.

2. The detection control device according to claim 1, wherein the distribution amount of data to each of the plurality of processing units is set in proportion to the performance value of each of the plurality of processing units.

3. The detection control device according to claim 1, wherein a first determining unit determines the load index value based on a number of image regions having a predetermined size and set in the processing target region to be subjected to the detection of the target cell.

4. The detection control device according to claim 1, further comprising an output unit that outputs, after the processing result acquiring unit has acquired the result of the process from each of the plurality of processing units, a detection result based on the acquired result of the process.

5. The detection control device according to claim 1, further comprising an extracting unit that extracts, from the imaged image, nucleus candidate regions that are image regions corresponding to candidates for a nucleus,
wherein the setting unit sets the plurality of processing target regions for the respective plurality of nucleus candidate regions extracted by the extracting unit.

6. A detection system comprising a detection control device and a plurality of processing devices,
wherein the detection control device includes
a processor that is configured to implement as:
a imaged image acquiring unit that acquires an imaged image resulting from imaging a specimen that is to be subjected to detection of a target cell,
a setting unit that sets a plurality of processing target regions in the imaged image, and
a distributing unit that distributes, in accordance with a distribution amount of data to each of the plurality of processing devices that detect the target cell in an image region, the plurality of processing target regions to the plurality of processing devices wherein
the distributing unit sets the distribution amount of data to each of the plurality of processing units to increase with an increase in a performance value of each of the plurality of processing units, by:
determining, for each of the plurality of processing target regions, a load index value corresponding to a size of a load of the process of detecting the target cell; and
determining load index values to be distributed to each of the plurality of processing units, based on a sum total of the load index values of the plurality of processing target regions and the performance value of each of the plurality of processing units, and
wherein the distributing unit distributes one or more processing target regions selected from the plurality of processing target regions, based on the sum of the load index values determined for each of the plurality of processing units, and
wherein each of the plurality of processing devices includes
a detector that detects the target cell in each of the processing target regions distributed by the distributing unit, and
a providing unit that provides a result obtained by the detector to the detection control device.

7. A non-transitory storage medium storing a program for causing a computer to function as:
a processor that is configured to implement as:
an imaged image acquiring unit that acquires an imaged image resulting from imaging a specimen that is to be subjected to detection of a target cell;
a setting unit that sets a plurality of processing target regions in the imaged image;
a distributing unit that distributes, in accordance with a distribution amount of data to each of a plurality of processing units that detect the target cell in an image region, the plurality of processing target regions to the plurality of processing units; and
a processing result acquiring unit that acquires, from each of the plurality of processing units, a result of a process of detecting the target cell in the processing target regions distributed to the respective plurality of processing units, wherein
the distributing unit sets the distribution amount of data to each of the plurality of processing units to increase with an increase in a performance value of each of the plurality of processing units, by:
determining, for each of the plurality of processing target regions, a load index value corresponding to a size of a load of the process of detecting the target cell; and determining load index values to be distributed to each of the plurality of processing units, based on a sum total of the load index values of the plurality of processing target regions and the performance value of each of the plurality of processing units, and wherein the distributing unit distributes one or more processing target regions selected from the plurality of processing target regions, based on the sum of the load index values determined for each of the plurality of processing units.

8. A detection control method comprising:

acquiring an imaged image resulting from imaging a specimen that is to be subjected to detection of a target cell;

setting a plurality of processing target regions in the imaged image;

distributing, in accordance with a distribution amount of data to each of a plurality of processing units that detect the target cell in an image region, the plurality of processing target regions to the plurality of processing units; and acquiring, from each of the plurality of processing units, a result of a process of detecting the target cell in the processing target regions distributed to the respective plurality of processing units, wherein the distribution amount of data to each of the plurality of processing units is set to increase with an increase in a performance value of each of the plurality of processing units, by:

determining, for each of the plurality of processing target regions, a load index value corresponding to a size of a load of the process of detecting the target cell; and determining load index values to be distributed to each of the plurality of processing units, based on a sum total of the load index values of the plurality of processing target regions and the performance value of each of the plurality of processing units, and wherein one or more processing target regions selected from the plurality of processing target regions is distributed, based on the sum of the load index values determined for each of the plurality of processing units.

\* \* \* \* \*